US009207980B2

(12) United States Patent
Solihin

(10) Patent No.: US 9,207,980 B2
(45) Date of Patent: *Dec. 8, 2015

(54) BALANCED PROCESSING USING HETEROGENEOUS CORES

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,307

(22) Filed: May 12, 2015

(65) Prior Publication Data

US 2015/0242240 A1 Aug. 27, 2015

Related U.S. Application Data

(63) Continuation of application No. 13/642,403, filed as application No. PCT/US2012/032886 on Apr. 10, 2012, now Pat. No. 9,047,137.

(51) Int. Cl.
*G06F 9/46* (2006.01)
*G06F 9/48* (2006.01)
*G06F 12/08* (2006.01)
*G06F 9/50* (2006.01)

(52) U.S. Cl.
CPC ............ *G06F 9/4881* (2013.01); *G06F 9/5011* (2013.01); *G06F 12/0842* (2013.01); *G06F 2212/6042* (2013.01)

(58) Field of Classification Search
CPC . G06F 9/4881; G06F 12/0842; G06F 9/5011; G06F 2212/6042

USPC .......................................... 718/102, 104, 105
See application file for complete search history.

(56) References Cited

U.S. PATENT DOCUMENTS 8,336,056 B1 12/2012 Gadir
8,452,991 B2 * 5/2013 Geissler et al. ............... 713/300
(Continued)

OTHER PUBLICATIONS

Becchi et al. "Dynamic thread assignment on heterogeneous multi-processor architectures", 2006, Proceedings of the 3rd conference on Computing frontiers, pp. 29-40.*

(Continued)

*Primary Examiner* — Emerson Puente
*Assistant Examiner* — Willy W Huaracha
(74) *Attorney, Agent, or Firm* — Moritt Hock & Hamroff LLP; Steven S. Rubin, Esq.

(57) ABSTRACT

Technologies are generally described for a multi-processor core and a method for transferring threads in a multi-processor core. In an example, a multi-core processor may include a first group including a first core and a second core. A first sum of the operating frequencies of the cores in the first group corresponds to a first total operating frequency. The multi-core processor may further include a second group including a third core. A second sum of the operating frequencies of the cores in the second group may correspond to a second total operating frequency that is substantially the same as the first total operating frequency. A hardware controller may be configured in communication with the first, second and third core. A memory may be configured in communication with the hardware controller and may include an indication of at least the first group and the second group.

20 Claims, 4 Drawing Sheets

(56) References Cited

U.S. PATENT DOCUMENTS

| | | |
|---|---|---|
| 2008/0288748 A1 | 11/2008 | Sutardja |
| 2009/0094481 A1 | 4/2009 | Vera et al. |
| 2010/0005474 A1 | 1/2010 | Sprangle et al. |
| 2011/0047350 A1 | 2/2011 | Geissler et al. |
| 2011/0088041 A1 | 4/2011 | Alameleen et al. |
| 2011/0191776 A1 | 8/2011 | Bose et al. |
| 2012/0042176 A1 | 2/2012 | Kim |
| 2013/0151879 A1 | 6/2013 | Thomson et al. |
| 2013/0212594 A1 | 8/2013 | Choi et al. |
| 2014/0082630 A1 | 3/2014 | Ginzburg et al. |

OTHER PUBLICATIONS

Qi et al., power Management for Real-Time embedded Systems on Block-Partitioned Multicore Platforms, Apr. 2011, retrieved on Jul. 25, 2012, retrieved from http://www.cs.utsa.edu/-dzhu/papers/ICESS08-qi.pdf>pp. 1-3.

Ilic et al., CHPS: An Environment for Collaborative Execution on Heterogeneous Desktop Systems, International Journal of Networking and Computing [online], Jan. 2011, retrieved from http://www.google.com/url?sa=t&rct=j&q=multicore%20propcessor%20transfer%20thread%20%22fourth%20core22&source=web&cd=11&ved=OC E4Q FjAAOAo&u rl=hllp%3A %2F%2Fwww.ijnc.org%2Findex. php%2 Finjnc%2 F article%2F download%2F16%2F13&ei=nCMQUMjoNca4qAHS1 YGADA &usg=AFQjCNH2A pwjK5vRIDu 16YkC4FM53G5A, pp. 99, 106.

Borkar, S. & Chien, A., The Future of Microprocessors, Communications of the ACM, 2011,10 pages, vol. 54.

Rangan. K., Powell, M., Wei, G., Brooks, D., Achieving uniform performance and maximizing throughput in the presence of heterogeneity, International Symposium on High-Performance Computer Architecture, 2011, pp. 3-14.

Rangan, K., Wei, G., & Brooks, D., Thread Motion: fine-grained power management for multi-core systems, International Symposium on Computer Architecture, 2009, 12 pages.

D. Shelepov & A. Fedorova, Scheduling on Heterogeneous Multicore Processors Using Architectural Signatures, retrieved from http://www.ideal.ece.ufl.edu/workshops/wiosca08/paper8.pdf on Feb. 6, 2013, 9 pages.

Brooks et al., Achieving uniform performance and maximizing throughput in the presence of heterogeneity, retrieved from http://michael.dmpowell.nel/papers/hpca2011.pdf on Feb. 6, 2013, 12 pages.

International Search Report for application with application No. PCT/US12/32886, dated Aug. 9, 2012,40 pages.

International Written Opinion for PCT application with application No. PCT/US12/32886, dated Aug. 9, 2012, 36 pages.

\* cited by examiner

300 A computer program product.

302 A signal bearing medium.

304
At least one of
One or more instructions for transferring threads in the multi-core processor; or
One or more instructions for receiving an instruction to process a first thread, a second thread, a third thread, and a fourth thread by a hardware controller; or
One or more instructions for transferring, by the hardware controller, the first thread to a first core; or
One or more instructions for transferring, by the hardware controller, the second thread to a second core; or
One or more instructions for transferring, by the hardware controller, the third thread to a third core; or
One or more instructions for transferring, by the hardware controller, the fourth thread to a fourth core,
where
    at least one of the first, second, third and fourth cores has an operating frequency different from at least one of the other cores; or
    the first and second cores are configured to operate with respective operating frequencies, and a first sum of the operating frequencies of the first and second cores corresponds to a first total operating frequency, or
    the third and fourth cores are configured to operate with respective operating frequencies, and a second sum of the operating frequencies of the third and fourth cores corresponds to a second total operating frequency, or
    the first and second sums are substantially the same; or
One or more instructions for waiting, by the hardware controller, a first period of time;
    after the first period of time has passed,
        One or more instructions for transferring, by the hardware controller, the first thread to the second core; or
        One or more instructions for transferring, by the hardware controller, the second thread to the first core;
One or more instructions for waiting, by the hardware controller, a second period of time;
    after the second period of time has passed,
        One or more instructions for transferring, by the hardware controller, the third thread to the fourth core; or
        One or more instructions for transferring, by the hardware controller, the fourth thread to the third core.

306 A computer readable medium

308 A recordable medium

310 A communications medium

Fig. 3

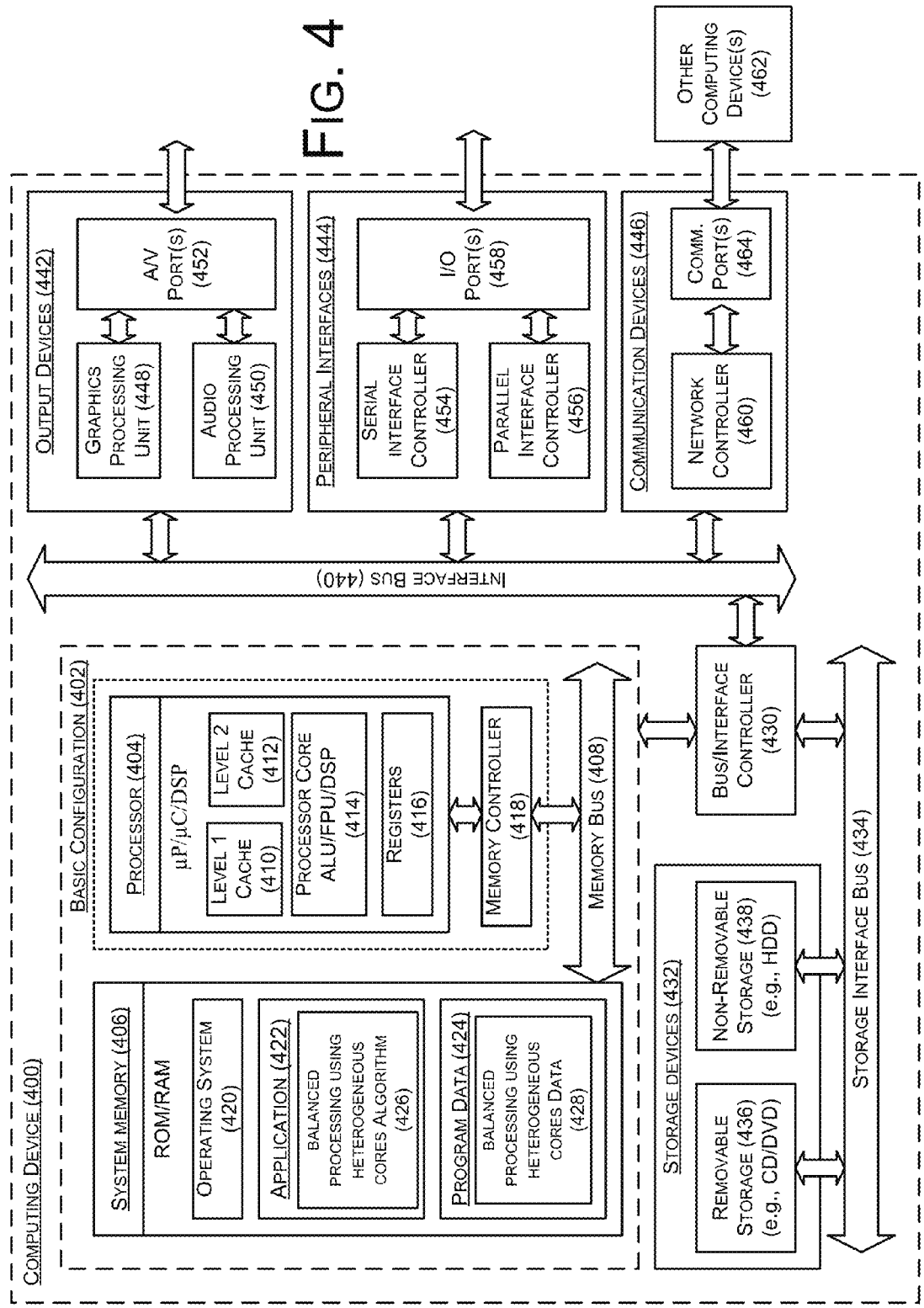

BALANCED PROCESSING USING HETEROGENEOUS CORES

CROSS REFERENCE TO RELATED APPLICATIONS

This application is a continuation under 35 U.S.C. §120 of U.S. application Ser. No. 13/642,403 filed on Oct. 19, 2012, issued as U.S. Pat. No. 9,047,137. U.S. application Ser. No. 13/642,403 is the National Stage filing under 35 U.S.C. §371 of PCT/US12/32886 filed on Apr. 10, 2012. The disclosures of these applications are hereby incorporated herein by reference in their entirety.

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single chip package. A thread to be processed may be sent by an operating system to the multi-core processor. The multi-core processor may receive the thread and use one or more cores to process the thread.

SUMMARY

In one example, a multi-core processor is generally described. The multi-core processor may include a first group including a first core and a second core. Each of the cores of the first group may be configured to operate with a respective operating frequency. A first sum of the operating frequencies of the cores in the first group may correspond to a first total operating frequency. The multi-core processor may include a second group including a third core. Each of the cores of the second group may be configured to operate with a respective operating frequency. A second sum of the operating frequencies of the cores in the second group may correspond to a second total operating frequency. The first total operating frequency and the second total operating frequency may be substantially the same. The multi-core processor may include a hardware controller configured in communication with each of the first, second and third cores. The multi-core processor may include a memory configured in communication with the hardware controller. The memory may include an identifier stored therein. The identifier may be associated with at least the first group and the second group.

In another example, a method for transferring threads in a multi-core processor is generally described. In some examples, the method may include receiving an instruction to process a first thread, a second thread, a third thread, and a fourth thread by a hardware controller. The method may further include transferring, by the hardware controller, the first thread to a first core. The method may further include transferring, by the hardware controller, the second thread to a second core. The method may further include transferring, by the hardware controller, the third thread to a third core. The method may further include transferring, by the hardware controller, the fourth thread to a fourth core. At least one of the first, second, third and fourth cores may have an operating frequency different from at least one of the other cores. The first and second cores may be configured to operate with respective operating frequencies. A first sum of the operating frequencies of the first and second cores may correspond to a first total operating frequency. The third and fourth cores may be configured to operate with respective operating frequencies. A second sum of the operating frequencies of the third and fourth cores may correspond to a second total operating frequency. The first and second sums may be substantially the same. The method may further include waiting, by the hardware controller, a first period of time. The method may further include, after the first period of time has passed, transferring, by the hardware controller, the first thread to the second core. The method may further include transferring, by the hardware controller, the second thread to the first core. The method may further include waiting, by the hardware controller, a second period of time. After the second period of time has passed, the method may further include transferring, by the hardware controller, the third thread to the fourth core. The method may further include transferring, by the hardware controller, the fourth thread to the third core.

In yet another example, a method for forming a multi-core processor is generally described. The method may include assigning, by a processor, a first core and a second core into a first group. The cores of the first group may be configured to operate with a respective operating frequency. A first sum of the operating frequencies of the first and the second cores may correspond to a first total operating frequency. The method may further include assigning, by the processor, a third core into a second group. The cores of the second group may each be configured to operate with respective operating frequencies. A second sum of the operating frequencies of the cores in the second group corresponds to a second total operating frequency. The first total operating frequency may be substantially the same as the second total operating frequency. The method may further include storing, by the processor, an identifier identifying the first group in a memory. The method may further include storing, by the processor, an identifier identifying the second group in the memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 3 illustrates an example computer program product for implementing balanced processing using heterogeneous cores; and FIG. 4 is a block diagram illustrating an example computing device that is arranged to implement balanced processing using heterogeneous cores;

Figure 1:
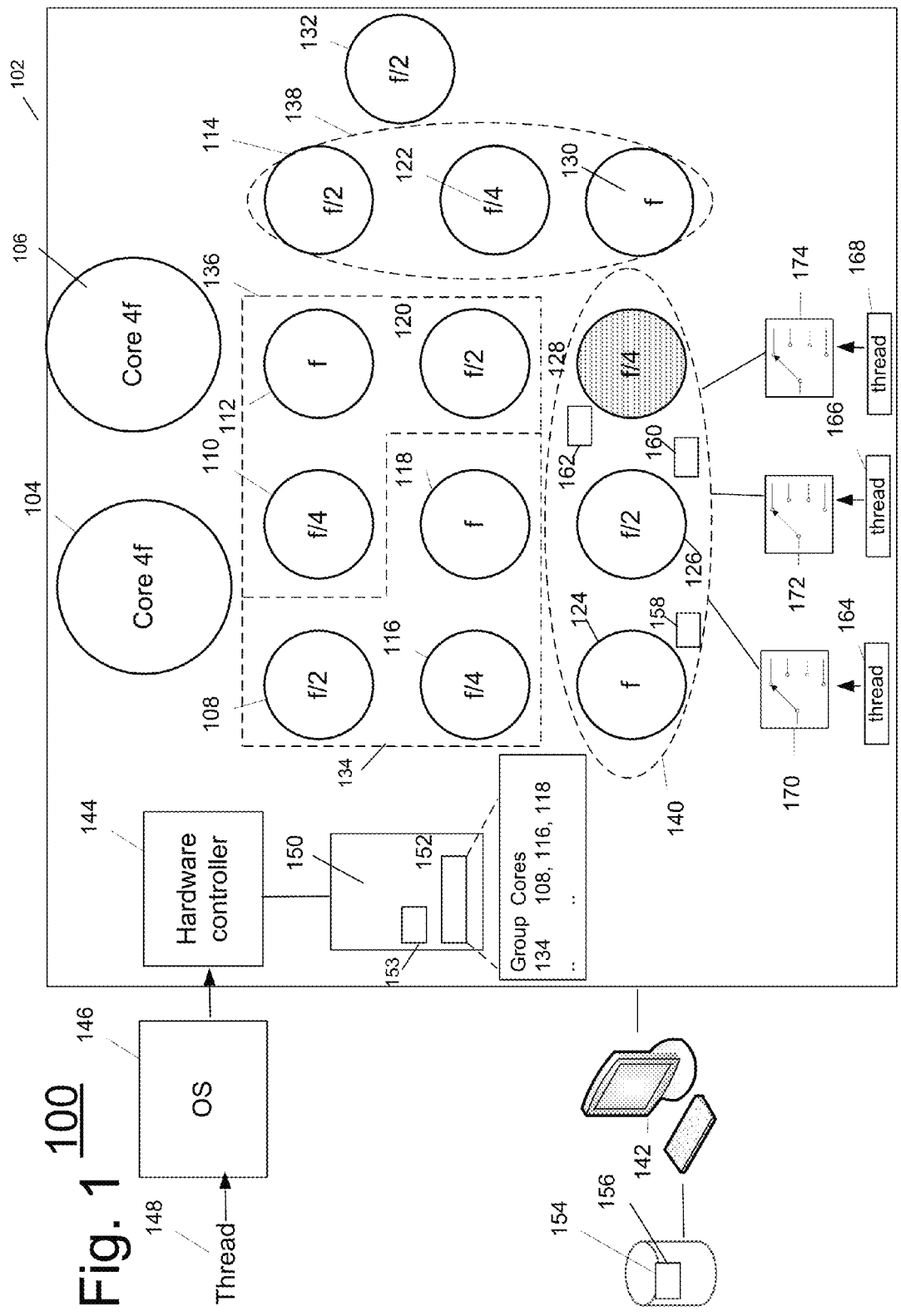
FIG. 1 illustrates an example system that can be utilized to implement balanced processing using heterogeneous cores.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to implementing balanced processing using heterogeneous cores.

Briefly stated, technologies are generally described for a multi-processor core and a method for transferring threads in a multi-processor core. In an example, a multi-core processor may include a first group including a first core and a second core. A first sum of the operating frequencies of the cores in the first group corresponds to a first total operating frequency. The multi-core processor may further include a second group including a third core. A second sum of the operating frequencies of the cores in the second group may correspond to a second total operating frequency that is substantially the same as the first total operating frequency. A hardware controller may be configured in communication with the first, second and third core. A memory may be configured in communication with the hardware controller and may include an indication of at least the first group and the second group.

FIG. 1 illustrates an example system that can be utilized to implement balanced processing using heterogeneous cores arranged in accordance with at least some embodiments presented herein. An example system 100 may include a multi-core processor 102 including cores 104, 106, 108, 110, 112, 114, 116, 118, 120, 122, 124, 126, 128, 130, and/or 132. Multi-core processor 102 may include a hardware controller 144 that is configured in communication with the cores in multi-core processor 102 and also configured in communication with a memory 150. In operation, one or more threads 148 of a process (or processes) may be received by an operating system 146. Operating system 146 may transfer thread 148 to multi-core processor 102 to be processed. A transfer may include, for example, sending, moving, assigning, scheduling, assigning a pointer and/or migrating a thread. In some examples, hardware controller 144 may be controlled by operating system 146. In some examples a hypervisor or virtual machine monitor, such as software layer that sits between hardware controller 144 and operating system 146, may control the operations discussed herein with respect to hardware controller 144.

Cores in multi-core processor 102 may each have a different operating frequency. For example, each of the cores (e.g., $core_1 \ldots core_j$) may have a frequency as noted by $f_1, f_2, \ldots f_j$. In a simple example, each of the operating frequencies for a group of cores may be described a multiple of a common frequency designated as f, such as 1f, 2f, 3f, 4f, 10f, etc. Although this example demonstrates integer values relative to the common frequency, any frequency may be used including fractional or floating point values relative to the common frequency such as 0.1f, 0.2f, f/4, f/2, f/3, 1.5f, 2.25f, 3.9f, 100.1f, etc. Generically, these frequencies can be described as Kf, where K may be an integer or non-integer value (e.g., floating point or fractional).

In one example, cores 104 and 106 may be configured to operate with an operating frequency of 4f, where f is a positive number. In some examples these cores may be larger and/or faster than other cores in the same system and thus may be used to process threads of single instruction streams. The other cores may have operating frequencies that are lower in value when compared to cores 104, 106. For example, they may operate at near threshold voltage. The different operating frequencies may be selected, in some examples, such that certain cores can provide high processing throughput while other cores may provide lower processing throughput with reduced power consumption or increased energy efficiency, which may be utilized to balance energy efficiency and processing speed. For example, cores 112, 118, 124 and 130 may have an operating frequency of f; cores 108, 120, 126, 114 and 132 may have a frequency of f/2; and cores 110, 116, 128, and 122 may have an operating frequency of f/4.

At a factory, before multi-core processor 102 is shipped to a distribution channel or an end-user consumer, or at boot time when the processor is started and configured, cores in the multi-core processor may be assigned into groups. In one example illustrated in FIG. 1, four groups of cores (134, 136, 138, and 140) can be assigned to differing groups. For example, group 134 may include cores 108, 116 and 118; group 136 may include cores 110, 112 and 120; group 140 may include cores 124, 126 and 128; group 138 may include cores 114, 122 and 130; and core 132 may be in its own fifth group.

A user or a processor 142 may determine to assign the cores into different groups such as based on a scheduling/assignment criteria. In some examples, instructions 156 are stored in a memory 154, where memory 154 is arranged in communication with processor 142 such that instructions 156 can be executed by processor 142 to effect assignment of cores into different groups. In some examples, cores may be assigned into groups so that a sum of the operating frequencies of the cores in at least some of the groups corresponds to the same sum operating frequency plus or minus 10%. In this way, substantially homogeneous groups of heterogeneous cores may be assigned. Threads may then be sent to these substantially homogenous groups as discussed herein.

In the example illustrated in FIG. 1, groups 134, 136, 138 and 140 each have an approximate total operating frequency of about 1.75f (i.e., there may be some nominal variations in the individual operating frequencies due to error tolerances, temperature, voltages and other factors). Core 132 may remain separate from the other groups and may be used for processing a sequential thread. As discussed in more detail below, each group may operate at approximately one-third (⅓) of the total operating frequency (e.g., 1.75f/3 or 0.5833f) which is also approximately equal to core 132 operating at about one-half (½) of frequency f. A table 152 may be stored in memory 150 for use by hardware controller 144 and may include indications of the cores in each group.

Processor 142 may also be configured to assign cores into groups based, at least in part, on a physical distance between cores. For example, processor 142 may consider all possible groups of cores, determine a physical distance between each of these groups, determine a total sum of these distances, and assign cores to groups so as to achieve the lowest total sum distance. Instructions 153 may be adapted to send threads to be processed by multi-core processor 102 in a variety of ways depending on a desired goal or criteria such as load balancing, core temperature control, processing threads at a highest processing speed, etc. Operating system 146 may be configured to send a core assignment request to hardware controller 144, where the core assignment request requests a core(s) to handle processing of thread(s) 148. Hardware controller 144 may then be configured to transfer a thread(s) 148 to a physical core(s) based on instructions 153 stored in memory 150.

Example goals or performance criteria may be varied depending on the specific application or applications. For example, a sequential application may include a single sequential thread. A parallel application may include multiple sequential threads that run in parallel with respect to one another. In some examples, the goal may be to achieve fastest performance for sequential applications, and instructions 153 may be written to indicate that hardware controller 144 should transfer received threads 148 to the fastest core in all groups. In other examples, the goal may be to achieve fastest performance for a parallel application, and instructions 153 may be written to indicate that hardware controller 144 should transfer received threads 148 to the fastest core in all groups. In the example, cores 118, 112, 124 and 130 may be the fastest cores in their respective groups. Transferring threads to the fastest core in all groups may be conceptually thought of as horizontal spreading in that the fastest cores in groups may be used. Similarly, a vertical type spreading may be used where all cores in a first group are used before cores in a second group. This vertical spreading may help in load balancing among threads that belong to a parallel application.

Processor 142 may be configured to select between either horizontal or vertical type spreading, if the goal is to achieve load balance among threads of a parallel application. The selection of spreading type may be determined based on the number (N) of threads 148 and/or the number (G) of groups of cores. In an example, N-threads may be assigned to a respective one of G-groups of cores, where each group has a number (M) of cores. In some examples, if N is equally divisible by G, then horizontal spreading may be used. In other examples, if N is divisible by M but N is not divisible by G, then vertical spreading may be used. In some additional examples, if N is not divisible by M and N is also not divisible by G, then controller 144 may calculate a sum of the aggregate frequencies of all of the cores that are considered for horizontal spreading's thread assignment in each group and calculate a difference between the maximum group aggregate frequency and a minimum group aggregate frequency, and assign that difference to a variable X. If the groups all have the same aggregate frequency, X should equal 0. Controller 144 may also calculate a sum of the aggregate frequencies of all of the cores that are considered for vertical spreading's thread assignment in each group and calculate a difference between the maximum group aggregate frequency and a minimum group aggregate frequency, and assign that difference to a variable Y. If the groups all have the same aggregate frequency, Y should equal 0. In the example if X<Y then horizontal spreading may be used. Otherwise, vertical spreading may be used.

After threads are transferred by controller 144 to cores, controller 144 may be configured to rotate threads among cores that are assigned threads in a group. For example, focusing on group 140 as illustrative, controller 144 may be configured to transfer three threads 164, 166, 168 to respective cores 124, 126, 128 in group 140. Core 124 may be arranged in communication with a cache 158. Core 126 may arranged be in communication with a cache 160. Core 128 may be arranged in communication with a cache 162. Caches 158, 160 and 162 may be, for example, L1 or L2 caches and may include other instructions or tables used by cores.

After a period of time, controller 144 may be configured to rotate threads 164, 166 and 168 among cores 124, 126, 128 and respective caches 158, 160, 162 even before threads 164, 166 and 168 have completed processing. For example, multiplexers 170, 172, and 174 can be configured to selectively couple cores and multiple different caches to process threads.

In one example, threads 164, 166, 168 may be selectively rotated among cores in group 140 at a particular interval, so that each thread may be processed at substantially the same time and at a speed defined by the average operating frequency of the three cores.

In one example, data for thread 164 processed by core 124 and stored in cache 158 may be subsequently rotated and used by another core. For example, data in cache 158 may be rotated and used by core 126 to process thread 164 because multiplexer 170 may be adapted to selectively couple core 126 with cache 158 according to a particular rotation interval. This described rotation interval may be utilized to avoid a result where one particular thread may be processed quicker than other threads because the particular thread may have been assigned to the fastest core for processing. The particular rotation interval may be assigned to hardware controller 144 by instructions 153. The rotation interval may calculated to be roughly one or two magnitudes larger than the time needed to fill an L1 cache of a core—in some examples this may be a few hundred to a few tens of thousands cycles. The rotation interval may be one or two magnitudes smaller than the size of a parallel computation task. The intersection of these two rotation interval factors (i.e. one or two magnitudes larger than the time that may be needed to fill an L1 cache, and one or two magnitudes smaller than a parallel computation task size) may define a rotation interval in a range of about one microsecond to about 1 millisecond.

In some examples, by rotating through the use of the various cores, operating system 146 may experience an approximately uniform core speed over a sufficiently long time interval. This approximately uniform core speed may be achieved despite the fact that the underlying cores are heterogeneous. Thus, by rotating through the various heterogeneous cores, substantially balanced processing of threads may be achieved. Threads may be written assuming substantially the same core size if desired and need not be tailored to different operating frequencies of cores.

Some threads may inherently require more processing time than other threads. Moreover, even with rotation of cores, one thread may finish processing in one core in a group before other cores in the same group have completed processing. The thread that finished first may sit idle in a wait or monitor state and effectively waste resources of the respective core. To further balance processing of threads, an idle thread may be swapped to a slower processing core in a group.

Continuing with focus on group 140, in an example, hardware controller 144 may be configured to receive a message that core 124 has finished processing thread 164 and that thread 164 is now waiting in a synchronization construct. For example, the thread may be executing instructions of a synchronization construct, but may not make any progress in computation because the thread is waiting inside the construct until other threads arrive. For example, thread 164 may execute an instruction such as MONITOR or MWAIT to indicate that thread 164 has completed processing and is waiting in a synchronization construct. In response to this message (i.e., processing is completed), controller 144 may be configured to transfer thread 164 to core 128 and also transfer thread 168 from core 128 to core 124. In response to the message that thread 168 in core 128 has completed processing, controller 144 may also determine to take core 128 out of rotation, as shown in gray shading, so that the next time threads rotate in group 140, only cores 124 and 126 rotate and core 128 keeps thread 164 in the idle state. The rotation of threads may continue until all threads complete their processing. In this way, threads that are still processing may be processed on cores in a group with the highest operating frequencies. The above described thread rotation may improve performance of programs with an inherent load imbalance among threads.

Among other possible benefits, a system arranged in accordance with the present disclosure may help increase an overall performance that instructions may be processed in a heterogeneous multi-core architecture. For example, instructions may be processed by the heterogeneous architecture even though the instructions were coded under the assumption that all cores on a chip have the same operating frequency, and even when the actual cores have different operating frequencies. With the presently disclosed techniques, the operating system need not be made aware of different operating frequencies of underlying cores in the heterogeneous architecture and thus be less concerned with scheduling.

Homogeneous groups of cores may be formed out of heterogeneous cores. By rotating threads among the various cores within a group of heterogeneous cores, threads associated to the group of cores can be processed at substantially the same rate. By rotating the communication of caches with each core, the overhead involved in migrating threads among cores may also be reduced. Threads requiring different processing times may, in combination, be processed quicker and less energy may be wasted in cores with threads waiting idle. Threads may be processed at a speed that is the average operating frequency of cores in a group as opposed to the speed of the slowest core.

Figure 2:
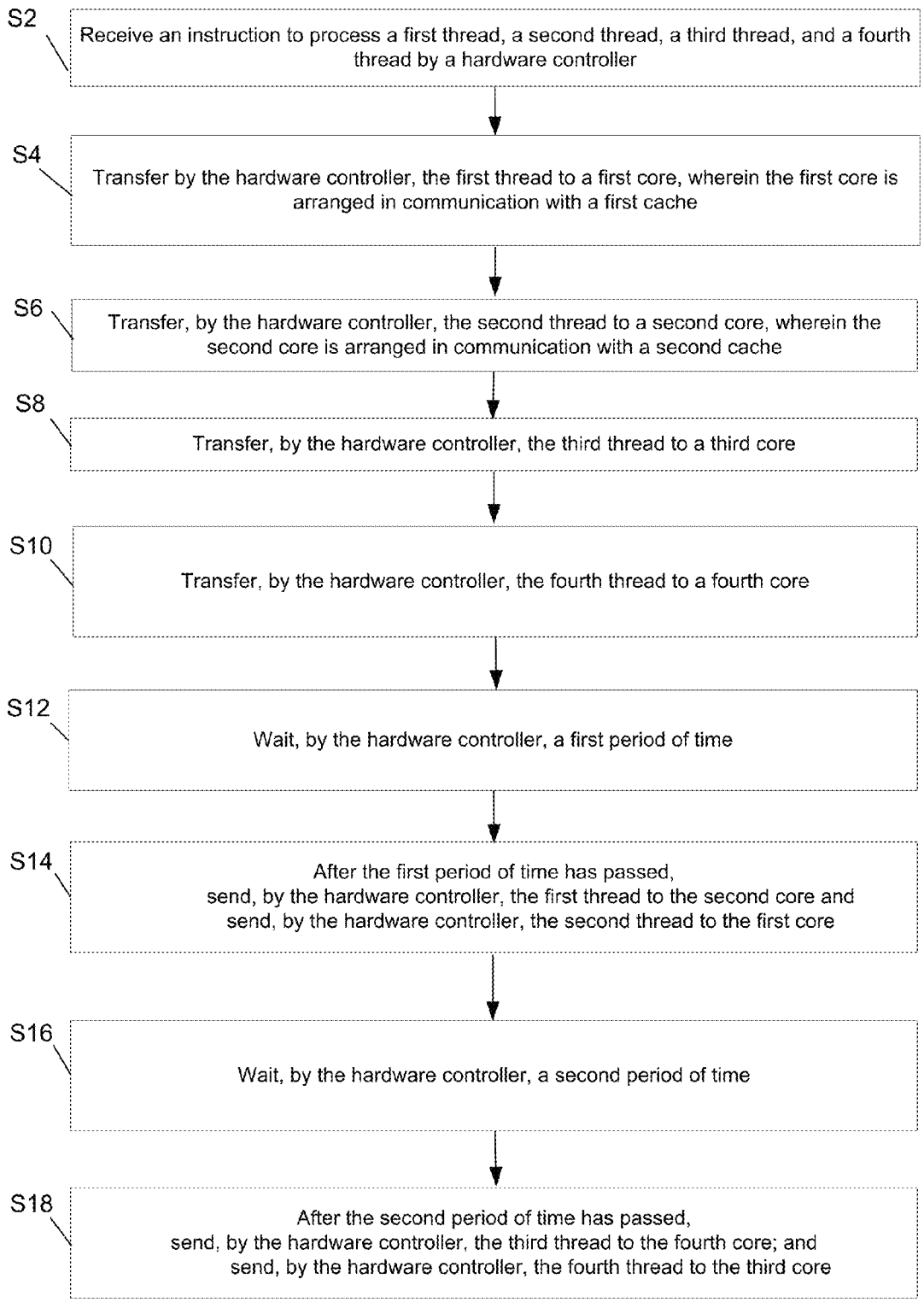
FIG. 2 depicts a flow diagram for an example process for implementing balanced processing using heterogeneous cores.

FIG. 2 depicts a flow diagram for an example process for implementing balanced processing using heterogeneous cores arranged according to at least some embodiments presented herein. In some examples, the process in FIG. 2 could be implemented using system 100 discussed above. An example process may include one or more operations, actions, or functions as illustrated by one or more of blocks S2, S4, S6, S8, S10, S12, S14, S16 and/or S18. Although illustrated as discrete blocks, various blocks may be divided into additional blocks, combined into fewer blocks, or eliminated, depending on the desired implementation.

Process 200 may begin at block S2, "Receive a request to process a first thread, a second thread, a third thread, and a fourth thread by a hardware controller". At block S2, a hardware controller may be configured to receive a request to process a first, second, third and fourth thread. For example, the controller may be in communication with an operating system and may receive from the operating system one or more requests to process the first, second third and fourth threads such as in conjunction with executing a series of instructions.

Processing may continue from block S2 to block S4, "Transfer by the hardware controller, the first thread to a first core, wherein the first core is arranged in communication with a first cache". At block S4, the hardware controller may be configured to transfer the first thread to a first core to process the instructions in the thread. The transfer may include, for example, sending, moving, migrating, assigning scheduling, assigning a pointer and/or migrating a thread through a data bus to the first core. The first core may be arranged in communication with a first cache.

Processing may continue from block S4 to block S6, "Transfer, by the hardware controller, the second thread to a second core, wherein the second core is arranged in communication with a second cache." At block S6, the hardware controller may be configured to transfer the second thread to a second core to process the instructions in the thread. The transfer may include, for example, sending, moving, migrating assigning, scheduling, assigning a pointer and/or migrating a thread to the second core. The second core may be arranged in communication with a second cache.

Processing may continue from block S6 to block S8, "Transfer, by the hardware controller, the third thread to a third core." At block S8, the hardware controller may transfer the third thread to a third core to process the instructions in the thread. The transfer include, for example, sending, moving, migrating assigning, scheduling, assigning a pointer and/or migrating a thread to the third core.

Processing may continue from block S8 to block S10, "Transfer, by the hardware controller, the fourth thread to a fourth core." At block S10, the hardware controller may transfer the fourth thread to a fourth core to process the instructions in the thread. The transfer include, for example, sending, moving, migrating assigning, scheduling, assigning a pointer and/or migrating a thread to the third core.

At least one of the first, second, third and fourth cores may have an operating frequency different from at least one of the other cores. A first group may include the first and the second cores. A first sum of the operating frequencies of the cores in the first group may correspond to a first total operating frequency. A second group may include the third and the fourth cores. A second sum of the operating frequencies of the cores in the second group may correspond to a second total operating frequency that is substantially the same as the first total operating frequency.

Processing may continue from block S10 to block S12, "Wait, by the hardware controller, a first period of time." At block S12, the hardware controller may be configured to wait a first period of time. The hardware controller could be configured to wait using a watchdog timer, an interrupt timer, or any other appropriate timer mechanism.

Processing may continue from block S12 to block S14, "After the first period of time has passed, transfer, by the hardware controller, the first thread to the second core and transfer, by the hardware controller, the second thread to the first core." At block S14, after the first period of time has passed, the hardware controller may be configured to transfer the first thread to the second core and transfer the second thread to the first core. This may rotate processing of threads among cores while maintaining data stored in respective caches.

Processing may continue from block S14 to block S16, "Wait, by the hardware controller, a second period of time." At block S16, the hardware controller may be configured to wait a second period of time.

Processing may continue from block S16 to block S18, "After the second period of time has passed, transfer, by the hardware controller, the third thread to the fourth core; and transfer, by the hardware controller, the fourth thread to the third core." At block S18, after the second period of time, the hardware controller may be configured to transfer the third thread to the fourth core and transfer the fourth thread to the third core.

FIG. 3 illustrates an example computer program product 300 arranged according to at least some embodiments presented herein. Program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, hardware controller 144 may undertake one or more of the blocks shown in FIG. 3 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 4 is a block diagram illustrating an example computing device 400 that is arranged to implement balance processing using heterogeneous cores according to at least some embodiments presented herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), a register file, a processor pipeline, or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a balanced processing using heterogeneous cores algorithm 426 that is arranged to perform the functions as described herein including those described with respect to system 100 of FIG. 1. Program data 424 may include balanced processing using heterogeneous cores data 428 that may be useful for balanced processing using heterogeneous cores algorithm as is described herein. In some embodiments, application 422 may be arranged to operate with program data 424 on operating system 420 such that balanced processing using heterogeneous cores may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A multi-core processor, comprising:
 a first core configured to operate at a first operating frequency;
 a first cache coupled to the first core, wherein the first cache is configured to be in communication with the first core;
 a second core configured to operate at a second operating frequency, wherein the second operating frequency is different from the first operating frequency, the first core and the second core comprise a first group, and a first sum of operating frequencies of cores in the first group corresponds to a first total operating frequency, wherein the first total operating frequency is substantially same as a second total operating frequency of a second group of cores of the multi-core processor;
 a second cache coupled to the second core, wherein the second cache is configured to be in communication with the second core; and
 a hardware controller configured in communication with the first and second cores, wherein the hardware controller is effective to:
 assign a first thread to the first core;
 assign a second thread to the second core;
 after a period of time, transfer the first thread to the second core and the second thread to the first core;
 in response to the transfer of the first thread to the second core, couple the first cache with the second core; and
 in response to the transfer of the second thread to the first core, couple the second cache with the first core.

2. The multi-core processor of claim 1, wherein the hardware controller is effective to transfer the first thread to the second core prior to completion of processing of the first thread by the first core.

3. The multi-core processor of claim 1, further comprising a first multiplexer and a second multiplexer, wherein:
the first multiplexer is configured to be in communication with the hardware controller, the first cache, the second cache, the first core, and the second core;
the second multiplexer is configured to be in communication with the hardware controller, the first cache, the second cache, the first core, and the second core; and
the hardware controller is effective to:
assign the first thread to the first core through the first multiplexer;
assign the second thread to the second core through the second multiplexer;
after the period of time has passed, the hardware controller is effective to:
transfer the first thread to the second core through the first multiplexer;
transfer the second thread to the first core through the second multiplexer;
couple the first cache with the second core through the first multiplexer; and
couple the second cache with the first core through the second multiplexer.

4. The multi-core processor of claim 1, wherein the period of time is a first period of time, and wherein the first period of time is at least one magnitude larger than a second period of time, wherein the second period of time represents an amount of time for the first core to fill the first cache.

5. The multi-core processor of claim 1, wherein the period of time is a first period of time, and wherein a first value of the first period of time is at least one magnitude smaller than a second value, wherein the second value represents a size of a parallel computation task.

6. The multi-core processor of claim 1, wherein the first group is effective to process the first and second threads at a substantially same rate based at least in part on the transfer of the first thread to the second core and the transfer of the second thread to the first core.

7. The multi-core processor of claim 1, wherein another processor is effective to determine that the first and second cores are grouped in the first group based at least in part on a distance between the first and second cores.

8. A method to transfer threads in a multi-core processor, the method comprising:
transferring, by a hardware controller, a first thread to a first core, wherein a first cache is coupled to the first core;
transferring, by the hardware controller, a second thread to a second core, wherein a second cache is coupled to the second core, and wherein the first core and the second core are assigned to a first group;
transferring, by the hardware controller, a third thread to a third core, wherein a third cache is coupled to the third core;
transferring, by the hardware controller, a fourth thread to a fourth core, wherein a fourth cache is coupled to the fourth core, and wherein the third core and the fourth core are assigned to a second group;
wherein:
at least one of the first, second, third, and fourth cores has an operating frequency different from at least one of the other cores;
a first sum of the operating frequencies of cores of the first group corresponds to a first total operating frequency;
a second sum of the operating frequencies of cores of the second group corresponds to a second total operating frequency, and
the first and second sums are substantially same;
waiting, by the hardware controller, a first period of time after the transfer of the first thread to the first core;
after the first period of time has passed:
transferring, by the hardware controller, the first thread to the second core and the second thread to the first core;
in response to transferring the first thread to the second core, coupling the first cache with the second core; and
in response to transferring the second thread to the first core, coupling the second cache with the first core;
waiting, by the hardware controller, a second period of time after the transfer of the third thread to the third core; and
after the second period of time has passed:
transferring, by the hardware controller, the third thread to the fourth core and
the fourth thread to the third core;
in response to the transfer of the third thread to the fourth core, coupling the third cache to the fourth core; and
in response to the transfer of the fourth thread to the third core, coupling the fourth cache to the third core.

9. The method of claim 8, wherein the hardware controller is effective to transfer the first thread to the second core prior to completion of processing of the first thread by the first core.

10. The method of claim 8, wherein after the first core indicates that the first core has completed processing the first thread, the method comprises:
the transferring, by the hardware controller, the first thread to the second core;
in response to transferring the first thread to the second core, the coupling, by the hardware controller, the first cache with the second core;
the transferring, by the hardware controller, the second thread to the first core; and
in response to transferring the second thread to the first core, the coupling, by the hardware controller, the second cache with the first core.

11. The method of claim 8, further comprising processing the first and second threads at a substantially same rate based at least in part on transferring the first thread to the second core and the second thread to the first core.

12. The method of claim 11, wherein processing the first and second threads at the substantially same rate is further based on coupling the first cache with the second core and coupling the second cache with the first core.

13. The method of claim 8, wherein the first period of time is at least one magnitude larger than a third period of time, wherein the third period of time represents an amount of time for the first core to fill the first cache.

14. A method to operate a multi-core processor, the method comprising:
assigning a first core and a second core into a first group, wherein the first core is configured to operate at a first operating frequency and the second core is configured to operate at a second operating frequency, wherein a first sum of operating frequencies of cores of the first group corresponds to a first total operating frequency;
assigning a third core into a second group, wherein the third core is configured to operate at a third operating frequency, wherein at least one of the first, second, or third operating frequencies is different from the others of the first, second, or third operating frequencies, wherein a second sum of operating frequencies of cores in the second group corresponds to a second total operating frequency, and the first total operating frequency is substantially same as the second total operating frequency;

identifying, by a hardware controller, an instruction to process a first thread, a second thread, and a third thread;

transferring, by the hardware controller, the first thread to the first core;

processing, by the first core, the first thread;

storing, by the first core, first data in a first cache, wherein the first data results from the processing of the first thread by the first core, and wherein the first cache is coupled to the first core;

transferring, by the hardware controller, the second thread to the second core;

processing, by the second core, the second thread;

storing, by the second core, second data in a second cache, wherein the second data results from the processing of the second thread by the second core, and wherein the second cache is coupled to the second core;

transferring, by the hardware controller, the third thread to the third core;

processing, by the third core, the third thread;

storing, by the third core, third data in a third cache, wherein the third data results from the processing of the third thread by the third core, and wherein the third cache is coupled to the third core;

waiting, by the hardware controller, a period of time after the transfer of the first thread to the first core;

after the period of time has passed:
  transferring, by the hardware controller, the first thread to the second core;
  in response to transferring the first thread to the second core, coupling the first cache with the second core such that the second core has access to the first data;
  transferring, by the hardware controller, the second thread to the first core; and
  in response to transferring the second thread to the first core, coupling, by the hardware controller, the second cache with the first core, such that the first core has access to the second data.

15. The method of claim 14, wherein the hardware controller is effective to transfer the first thread to the second core prior to completion of processing of the first thread by the first core.

16. The method of claim 14, wherein after the first core indicates that the first core has completed processing the first thread, the method comprises:
  the transferring, by the hardware controller, the first thread to the second core;
  in response to transferring the first thread to the second core, the coupling, by the hardware controller, the first cache with the second core;
  the transferring, by the hardware controller, the second thread to the first core; and
  in response to transferring the second thread to the first core, the coupling, by the hardware controller, the second cache with the first core.

17. The method of claim 14, further comprising processing the first and second threads at a substantially same rate based at least in part on transferring the first thread to the second core and the second thread to the first core.

18. The method of claim 17, wherein processing the first and second threads at the substantially same rate is further based on coupling the first cache with the second core and coupling the second cache with the first core.

19. The method of claim 14, wherein the period of time is a first period of time, and wherein the first period of time is at least one magnitude larger than a second period of time, wherein the second period of time represents an amount of time for the first core to fill the first cache.

20. The method of claim 14, wherein the hardware controller is effective to transfer the first thread to the second core prior to completion of processing of the first thread by the first core; and
  wherein the period of time is a first period of time, and wherein the first period of time is at least one magnitude larger than a second period of time, wherein the second period of time represents an amount of time for the first core to fill the first cache.

* * * * *